United States Patent
Maver

[19]

[11] Patent Number: 6,079,741
[45] Date of Patent: Jun. 27, 2000

[54] VEHICLE BED BALLAST APPARATUS

[76] Inventor: Ryan D. Maver, 1968 Marshfield, Mayfield Heights, Ohio 44124

[21] Appl. No.: 09/065,473

[22] Filed: Apr. 24, 1998

[51] Int. Cl.[7] .................................................. B60R 27/00
[52] U.S. Cl. ........................ 280/759; 296/37.6; 224/404
[58] Field of Search ................................... 280/757, 758, 280/759, 769, 763.1; 224/404, 403, 402, 42.11, 42.32, 42.34, 540, 539, 542, 543, 551; 296/37.6

[56] References Cited

U.S. PATENT DOCUMENTS

| | | | |
|---|---|---|---|
| 3,714,890 | 2/1973 | Moon | 100/229 A |
| 3,727,971 | 4/1973 | Sisler . | |
| 4,288,011 | 9/1981 | Grossman | 280/769 X |
| 4,339,142 | 7/1982 | Tanner et al. . | |
| 4,796,914 | 1/1989 | Raynor . | |
| 4,902,038 | 2/1990 | Grover . | |
| 4,971,356 | 11/1990 | Cook . | |
| 5,080,418 | 1/1992 | Semple et al. . | |
| 5,090,785 | 2/1992 | Stamp | 312/319 |
| 5,127,564 | 7/1992 | Romero | 224/42.45 R |
| 5,172,953 | 12/1992 | Chamberlain . | |
| 5,330,227 | 7/1994 | Anderson . | |
| 5,439,152 | 8/1995 | Campbell | 280/769 R |
| 5,494,315 | 2/1996 | Heltenburg | 280/759 |
| 5,505,358 | 4/1996 | Haase | 224/539 |
| 5,524,951 | 6/1996 | Johnson | 296/37.6 |
| 5,582,441 | 12/1996 | Frost . | |
| 5,605,264 | 2/1997 | Neal | 224/404 |
| 5,657,916 | 8/1997 | Tackett | 224/404 |

*Primary Examiner*—Peter C. English
*Assistant Examiner*—Ruth Ilan
*Attorney, Agent, or Firm*—Tipton L. Randall

[57] ABSTRACT

A traction enhancing ballast device for use in the cargo compartment of a vehicle is disclosed. The device includes a pair of hollow ballast container members, each one fastened to a flat anchor plate on opposite ends of a telescoping bracing bar member. The ballast containers each have a hinged top lid for adding and removing ballast, such as sand, to the container. The container has a curved end that fits against the wheel well of a vehicle. The device is mounted behind the wheel wells in the cargo compartment of a vehicle with the bracing bar member extended to hold the containers against the sidewalls of the cargo compartment. The device is locked in place by inserting a pin member through aligned apertures in the telescoping bracing bar member. The end of the container opposite the curved end has a spout that is used to empty the ballast contents of the containers when not in use.

8 Claims, 4 Drawing Sheets

VEHICLE BED BALLAST APPARATUS

FIELD OF THE INVENTION

The present invention relates generally to ballast devices for vehicle beds and, more particularly, to ballast devices specially adapted for use in the cargo compartment of pickup trucks and the like.

BACKGROUND OF THE INVENTION

Trucks generally have rear wheel drive, and when truck beds are empty, the weight over the rear wheels may be insufficient to provide adequate traction for the rear wheel. Other vehicles such as covered cargo vans and mini-vans also encounter the same traction problem when operated with little or no load over the rear wheels. A number of innovations have been developed relating to providing extra weight or ballast for truck beds and cargo vans, and the following U.S. patents are representative of some of those innovations.

In U.S. Pat. No. 3,727,971 Sisler discloses a receptacle unit formed to fit over the upwardly arched fender section of the box of a truck bed. The unit is filled with particulate material to provide additional traction for the truck. Additional containers are attached to the unit for storage or other purposes.

Tanner, in U.S. Pat. No. 4,339,142, describes a flexible rubber tubing filled with sand for providing ballast in a motor vehicle. In U.S. Pat. No. 5,582,441 Frost discloses a hollow front bumper for vehicles that is designed to deliver sand ahead of the vehicle using a pneumatic nozzle system to assist in breaking on slippery surfaces.

Raynor, in U.S. Pat. No. 4,796,914, Chamberlain, in U.S. Pat. No. 5,172,953, Semple et al., in U.S. Pat. No. 5,080,418, and Anderson, in U.S. Pat. No. 5,330,227, all describe a ballast chamber located on the truck bed floor which can be filled with liquid or particulate solids to provide additional weight over the truck rear wheels.

An interlocking compartmentalized weight ballast for vehicles is described by Cook in U.S. Pat. No. 4,971,356, and by Grover in U.S. Pat. No. 4,902,038. Tackett, in U.S. Pat. No. 5,657,916, discloses a molded shell with hinged cover for carrying ballast in a pickup truck, the shell fitting around the wheel wells and having half the height of the truck box sidewalls. In U.S. Pat. No. 5,494,315 Heltenburg describes containers for particulate ballast which can be located along the truck bed sides and over the wheel wells of a pickup truck.

Thus, the desirable features for a traction enhancing weight or ballast system for use in the cargo compartment of a vehicle include: 1) weight occupies minimal space in the vehicle cargo bed; 2) weight should be flat to allow items to be placed atop it; 3) weight should be easy to install and remove; 4) weight should remain stationary during vehicle movement; 5) amount of weight should be easily changed; and 6) weight should resist attack by the elements. Consequently, there is an unmet need for a traction enhancing weight or ballast system with these features.

SUMMARY OF THE INVENTION

The present invention is a traction enhancing weight device for use in the cargo compartment of a vehicle. The device comprises a pair of generally flat anchor plate members with both plate members positioned in a plane. A telescoping bracing bar member having concentric sections sized to slide one within another is also positioned in the plane, between the plate members. The bar member is connected at a first end to an edge of a first flat anchor plate member and is connected at a second end to an edge of a second flat anchor plate member. One of a pair of hollow ballast container members is secured to each flat anchor plate member. The hollow ballast container members are sized to fit against a vehicle bed sidewall. The hollow ballast container members each have one curved end to fit against a wheel well in the vehicle bed. Each hollow ballast container member has a top lid member hinged at one end and fitted with a fastener at an opposite end for accessing the container member's hollow interior. The hollow ballast container members each also have a rear spout member opposite the curved wheel well engaging end. The spout member is hinged at the edge adjacent the anchor plate member for opening the spout member to empty the hollow ballast container member when not in use. The spout member has a fastener to secure the spout in a closed position. The bar member concentric sections contain a plurality of apertures that are positioned to accept a locking pin member inserted through the concentric sections. By extending the bar member concentric sections and inserting the pin member through selected aligned apertures, the anchor plate members and the hollow ballast container members attached thereto are positioned securely against a sidewall and wheel well of a vehicle cargo area.

DESCRIPTION OF THE PREFERRED EMBODIMENTS

Nomenclature

Figure 1:
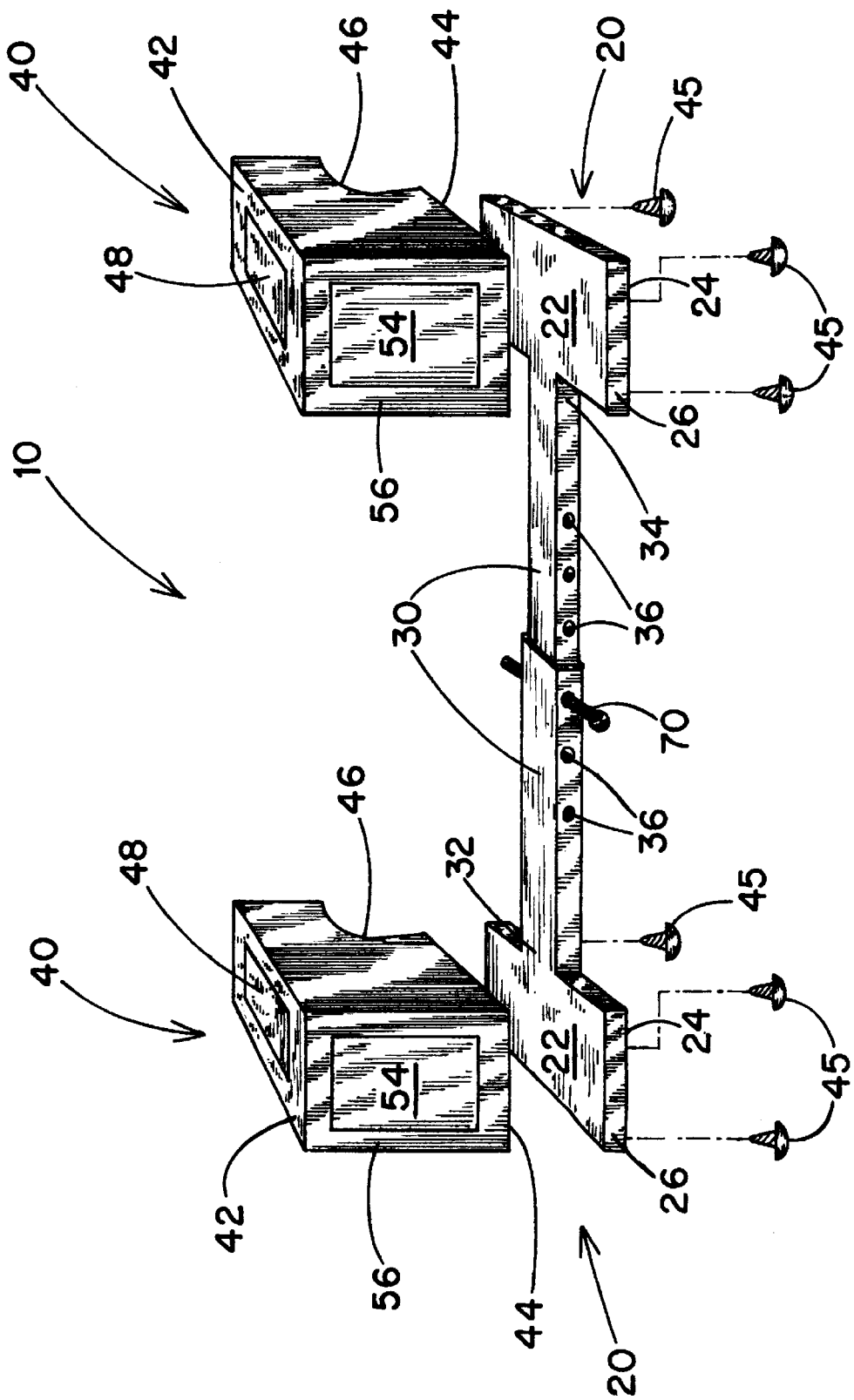
FIG. 1 is a perspective plan view of the traction enhancing ballast device of the present invention.

10 Traction Enhancing Ballast Device
20 Flat Anchor Plate Members
22 Top Flat Surface of Plate Member
24 Bottom Flat Surface of Plate Member
26 Edge Surface of Plate Member
30 Telescoping Bracing Bar Member
32 First End of Bracing Bar Member
34 Second End of Bracing Bar Member
36 Apertures in Bracing Bar Member
40 Hollow Ballast Container Members
42 Top of Ballast Container Member
44 Bottom of Ballast Container Member
45 Thread Fasteners
46 Curved End of Ballast Container Member
48 Top Lid Member of Ballast Container Member
50 Hinge of Top Lid Member
52 Fastener of Top Lid Member
53 Sealing Gasket Member
54 Rear Spout Member of Ballast Container Member
56 Vertical Container End Opposite Curved End
58 Hinge of Spout Member
60 Fastener of Spout Member
62 Side Panel of Spout Member
70 Locking Pin Member
B Cargo Compartment of Vehicle
S Sidewall of Cargo Compartment
W Wheel Well of Vehicle Construction The traction enhancing ballast device 10 of the present invention is shown in FIGS. 1–4. The device 10 is designed for use in the cargo compartment of a vehicle such as a pickup truck, covered cargo van, or even a sport utility vehicle. As seen in FIG. 1, the device 10 includes a pair of generally flat anchor plate members 20. Each plate member 20 has a top flat surface 22 and a bottom flat surface 24, as well as an edge surface 26. The flat anchor plate members 20 are positioned in a plane with a telescoping bracing bar member 30 between them. The telescoping bracing bar member 30 has concentric sections that are sized to slide one within another to vary the length of the bar member 30. The bar member 30 is connected at a first end 32 to an edge 26 of a first anchor plate member 20 and connected at a second end 34 to an edge 26 of a second anchor plate member 20, with the three components all oriented in a common plane. The telescoping bracing bar member 30 is preferably rectangular in cross section, although other geometrical shapes, such as circular or triangular, are contemplated. The concentric sections of the bar member 30 contain a plurality of apertures 36, described in detail later. The plate members 20 and the telescoping bracing bar member 30 are preferably fabricated from corrosion resistant metal, such as steel or aluminum.

One hollow ballast container member 40 is secured to the top flat surface 22 of each anchor plate member 20. The ballast container members 40 are generally rectangular in shape with a flat top 42 and a flat bottom 44, with the container bottom 44 resting upon the top surface 22 of the flat plate member 20. The container bottom 44 and flat plate member 20 are of equal dimensions. The preferred materials of construction for the container members 40 are synthetic polymeric resin, such as polyethylene, polypropylene or similar material. The ballast container members 40 may be bolted with threaded fasteners 45, or otherwise securely fastened to the plate members 20.

Figure 2:
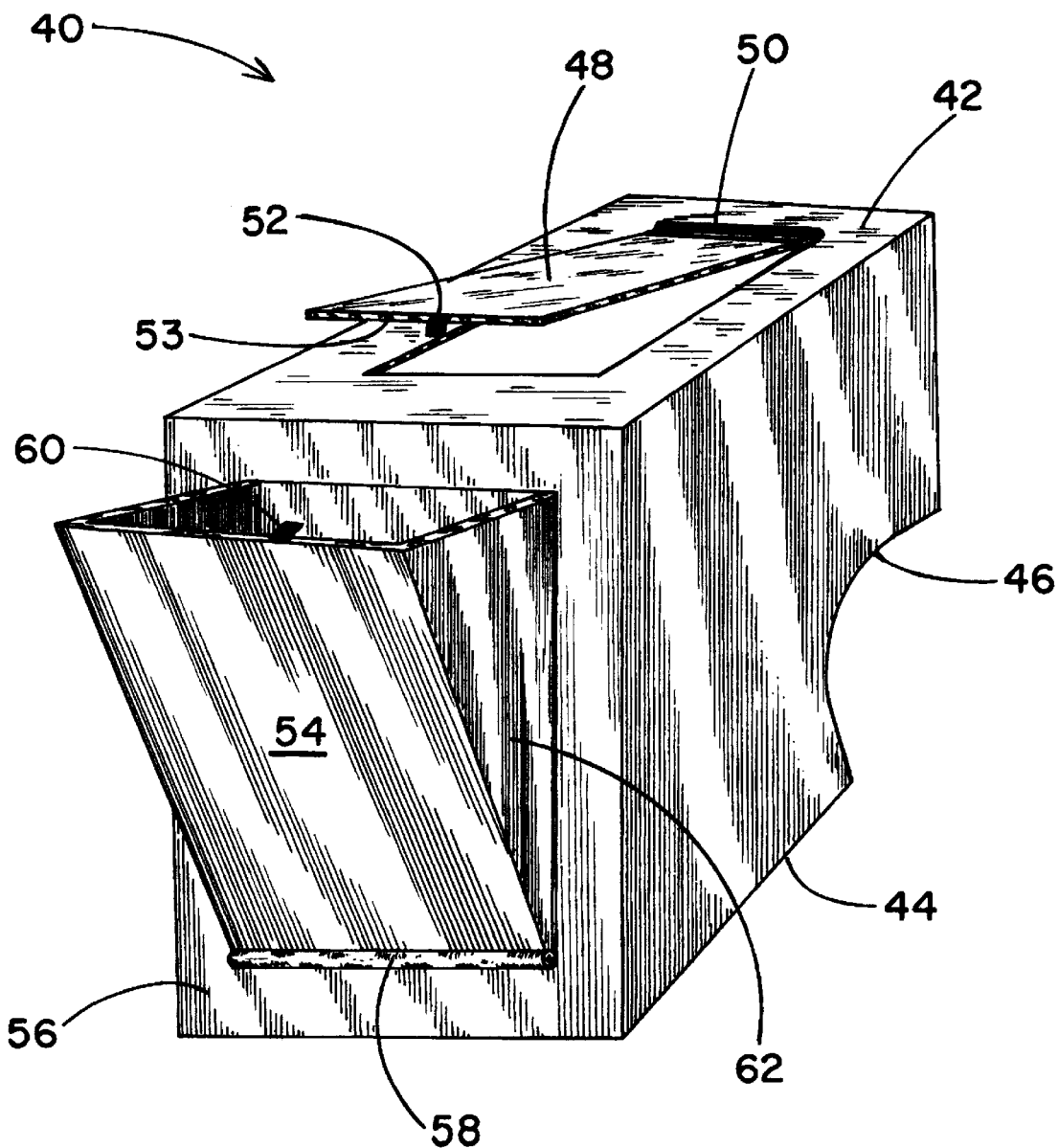
FIG. 2 is a perspective view of the hollow ballast container of the device.
Figure 3:
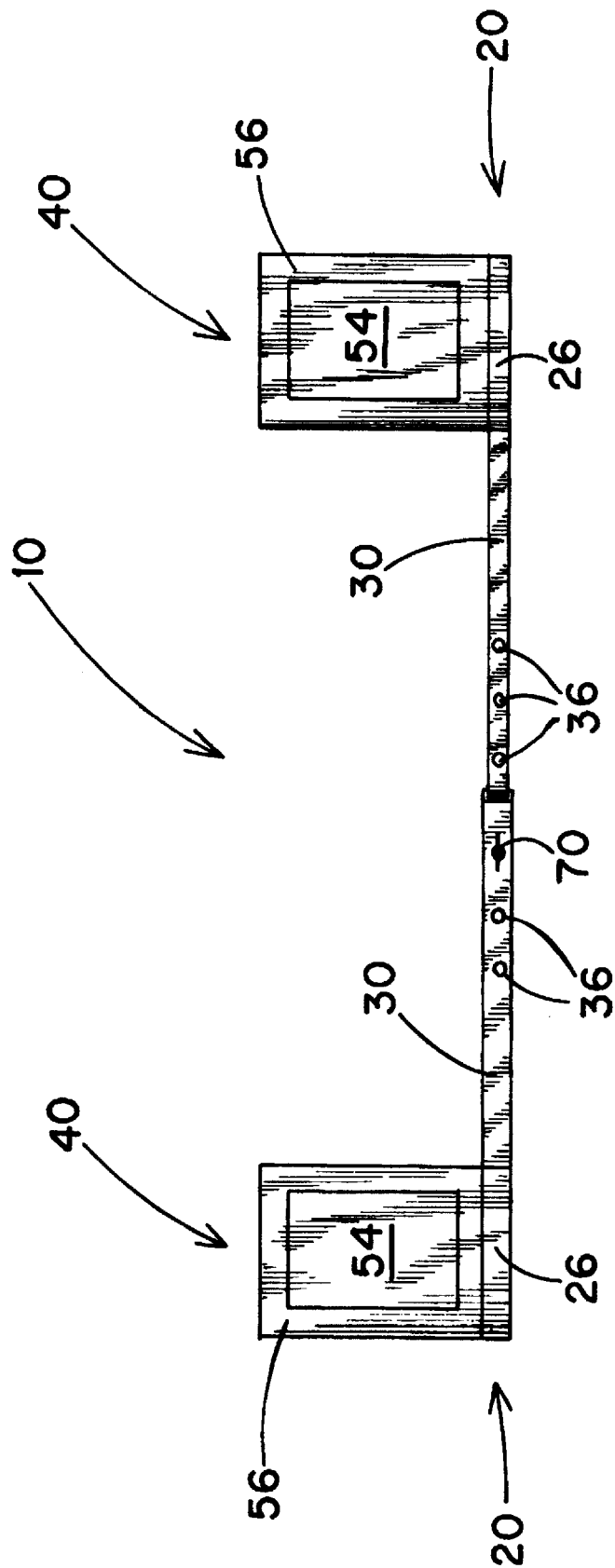
FIG. 3 is a rear plan view of the traction enhancing ballast device.
Figure 4:
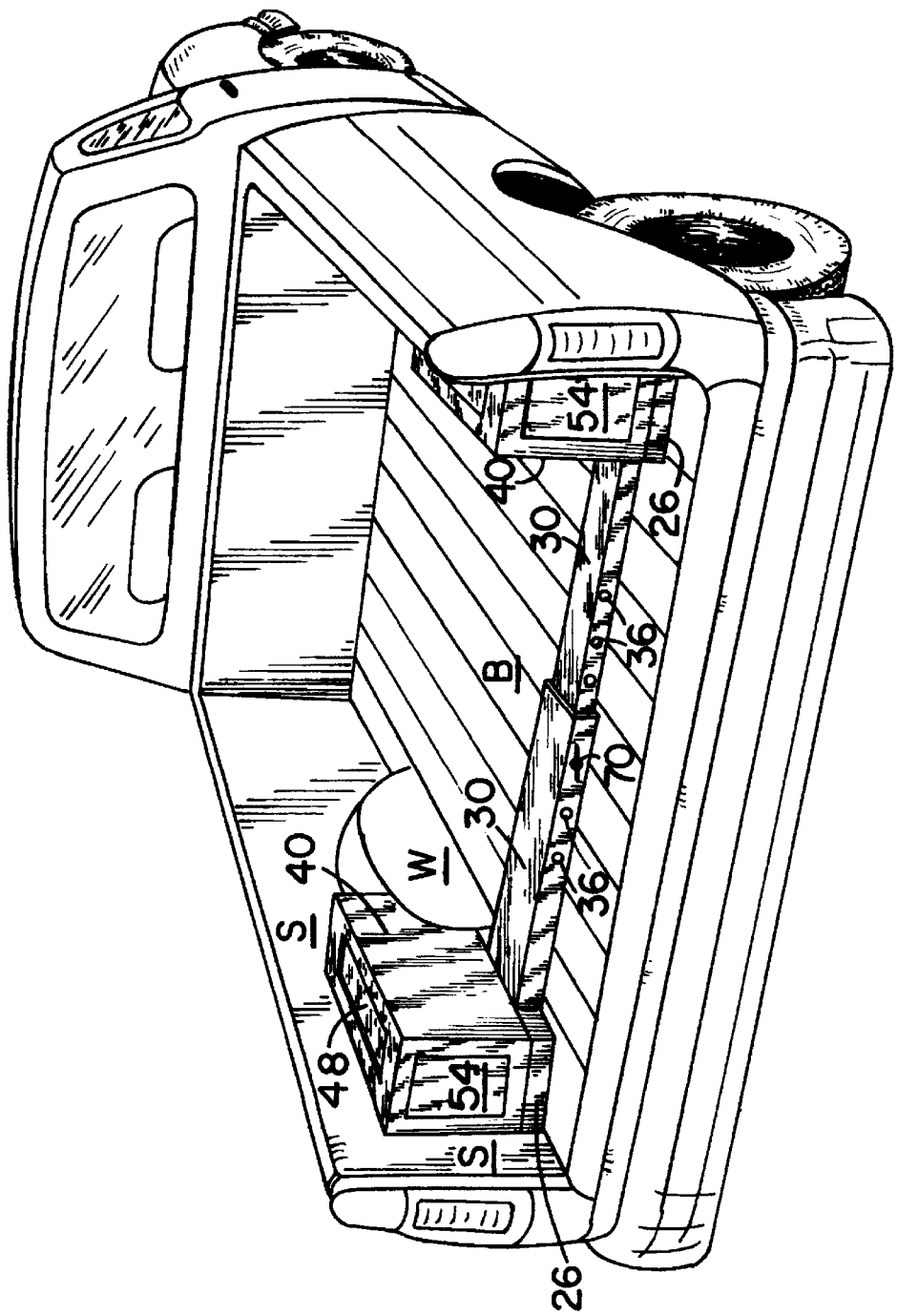
FIG. 4 is a perspective plan view of the ballast device positioned in the cargo compartment of a pickup truck.

Each hollow ballast container member 40 and attached plate member 20 is sized to fit against the vehicle bed sidewall, with each container member 40 having one curved end 46 designed to fit against a wheel well W located in the vehicle cargo compartment B as seen in FIG. 4. The top 42 of the ballast container member 40 has a top lid member 48 to allow access to the interior of the hollow container member 40. The lid member 48 contains a hinge member 50 at one end and a fastener member 52 at the opposite end as shown in FIG. 2. The hollow ballast container members 40 are designed to receive a quantity of particulate ballast material, such as sand or gravel. The hollow ballast container members can be filled with particulate ballast material added to the container through the lid opening. The lid member 48 preferably has a sealing gasket member 53 fastened to an interior surface of the top lid member 48. The gasket member 53 provides a water tight seal between the container member 40 and the top lid member 48 with the lid member in a closed orientation.

Each hollow ballast container member 40 also contains a rear spout member 54 positioned in the vertical end 56 of the container member 40 opposite the curved end 46 of the container member 40. The rear spout member 54 has a hinge member 58 positioned at an edge of the spout member nearest the anchor plate member 20 and a fastener member 60 positioned at an edge of the spout member opposite the hinge member 58. It is preferred that the fastener member 60 be capable of being locked to prevent inadvertent opening of the spout member 54. The spout member 54 can be opened a partial distance from vertical to allow easy emptying of the particulate ballast material of the ballast container member 40 when not in use. The spout member 54 contains side panels 62 which prevent the particulate ballast from spilling around the edge of the spout member 54 when it is opened to empty the container member 40 contents. The spout member 54 preferably comprises a flat front panel with perpendicular side panels 62 that retract within the hollow ballast container member 40 with the spout member 54 in a closed position. The side panels 62 extend between the front panel and the hollow ballast container member 40 with the spout member 54 in an open position. This feature prevents spillage of particulate ballast material from the container member 40 with the spout member 54 in an open position.

As mentioned above, the concentric sections of the bar member 30 contain a plurality of apertures 36 that can be aligned with the telescoping bracing bar member 30 extended to various lengths. The apertures 36 are positioned on both sides and both sections of the telescoping bracing bar member 30 such that sets of four holes can be aligned with the bar member 30 extended to various lengths. By extending the bar member 30, the anchor plate members 20 and hollow ballast containing members attached thereto, can be positioned securely against each sidewall and wheel well W of the cargo compartment B of a vehicle. The telescoping bracing bar member 30 is maintained at the desired degree of extension by inserting a locking pin member 70 through the aligned apertures 36 of the concentric sections of the bar member 30. The locking pin member 70 may be secured in position with a padlock or similar locking device to prevent removal of the ballast device 10 from the cargo compartment of a vehicle. This is particularly useful for open bed vehicles, such as pickup trucks.

The ballast device 10 of the present invention provides numerous advantages over the prior art devices. The present device 10 is easily positioned and rigidly secured in the cargo area of a variety of vehicles by the telescoping bracing bar member 30. Once in position, the container members 40 of the ballast device 10 is conveniently filled with particulate ballast material, such as sand, through the hinged top lid member 48. The top lid member 48 has a sealing gasket member 53 affixed to the inner side thereof to prevent entry of water into the particulate ballast material stored in each container member 40. This feature is most important when the ballast device 10 is used in open cargo vehicles such as pickup trucks. The hinged lid member 48 also allows easy access to the particulate ballast material contained therein for spreading on a slippery surface to improve traction for the vehicle or an individual. The hinged spout member 54 provides a convenient exit for removing the particulate ballast material from each container member 40 when the ballast device 10 is no longer required in the vehicle.

While the invention has been particularly shown and described with reference to a preferred embodiment thereof, it will be understood by those skilled in the art that various changes in form and details may be made therein without departing from the spirit and scope of the invention.

I claim:

1. A traction enhancing ballast device for use in a vehicle cargo compartment having a cargo bed, sidewalls and a pair of wheel wells, the ballast device comprising;

a) a pair of flat anchor plate members, both plate members positioned in one horizontal plane;

b) a telescoping bracing bar member having concentric sections sized to slide one within another, said bar member also positioned in said horizontal plane and between said plate members, said bar member connected at a first end to an edge of a first anchor plate member and connected at a second end to an edge of a second anchor plate member;

c) a pair of hollow ballast container members, each container member having a flat bottom side secured to one flat anchor plate member, said flat anchor plate members and attached hollow ballast container members adapted to fit against the vehicle bed sidewall, said hollow ballast container members having one curved end adapted to fit against a wheel well in the vehicle cargo bed, said hollow ballast container members having a top lid member hinged at one end and fitted with a fastener at an opposite end for accessing said container member hollow interior, said hollow ballast container members having a rear spout member opposite said container curved end, said spout member hinged at an edge adjacent said anchor plate member for opening said spout member outwardly to empty said hollow ballast container member when not in use, said spout member having a fastener opposite said hinged edge for securing said spout member in a closed position; and d) a plurality of apertures in said bracing bar member concentric sections, said apertures positioned to accept a locking pin member inserted through said concentric sections, thereby adapted to position each of said anchor plate members and said hollow ballast container member attached thereto securely against the sidewall and the wheel well of the vehicle cargo compartment.

2. The ballast device according to claim 1 wherein said flat anchor plate members and telescoping bracing bar member are fabricated from metal.

3. The ballast device according to claim 1 wherein said bracing bar member is rectangular in cross section.

4. The ballast device according to claim 1 wherein said hollow ballast container members are fabricated of synthetic polymeric resin material.

5. The ballast device according to claim 1 wherein said hollow ballast container members are secured to said flat anchor plate members by means of threaded fasteners.

6. The ballast device according to claim 1 wherein said fastener opposite said hinged edge for securing said spout member in a closed position is lockable.

7. The ballast device according to claim 1 further comprising a sealing gasket member fastened to an interior surface of said top lid member, said gasket member providing a water tight seal between said container member and said top lid member with said lid member in a closed orientation.

8. The ballast device according to claim 1 wherein said spout member comprises a flat front panel with perpendicular side panels, said side panels retracting within said hollow ballast container member with said spout member in a closed position, and said side panels extending between said front panel and said hollow ballast container member with said spout member in an outwardly open position, thus preventing spillage of particulate ballast material from said container member with said spout member in an open position.

* * * * *